United States Patent
Liang et al.

(10) Patent No.: US 6,850,355 B2
(45) Date of Patent: Feb. 1, 2005

(54) ELECTROPHORETIC DISPLAY WITH COLOR FILTERS

(75) Inventors: Rong-Chang Liang, Cupertino, CA (US); Zarng-Arh George Wu, San Jose, CA (US); Scott C-J Tseng, San Jose, CA (US); Hongmei Zang, Sunnyvale, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 182 days.

(21) Appl. No.: 10/206,859

(22) Filed: Jul. 26, 2002

(65) Prior Publication Data

US 2003/0021005 A1 Jan. 30, 2003

Related U.S. Application Data

(60) Provisional application No. 60/308,437, filed on Jul. 27, 2001.

(51) Int. Cl.[7] ............................. G02B 26/00; G09G 3/34
(52) U.S. Cl. ......................................... 359/296; 345/107
(58) Field of Search ................................. 359/296, 243, 359/240; 345/107, 108, 44, 84; 430/35, 45; 204/478, 485

(56) References Cited

U.S. PATENT DOCUMENTS

| 3,229,607 | A | 1/1966 | Battaglia ...................... 355/88 |
| 3,612,758 | A | 10/1971 | Evans et al. .............. 178/5.4 R |
| 3,668,106 | A | 6/1972 | Ota ............................. 204/299 |
| 3,689,346 | A | 9/1972 | Rowland ..................... 156/245 |
| 3,697,679 | A | 10/1972 | Hathaway ................. 178/6.6 A |
| 3,885,964 | A | 5/1975 | Nacci .......................... 430/326 |
| 3,892,568 | A | 7/1975 | Ota et al. ..................... 430/19 |
| 3,908,052 | A | 9/1975 | Sanders ....................... 428/1.5 |
| 3,928,671 | A | 12/1975 | Robusto et al. ............. 438/572 |
| 4,071,430 | A | 1/1978 | Liebert ........................ 204/299 |
| 4,093,534 | A | 6/1978 | Carter et al. ................. 350/355 |
| 4,190,352 | A | 2/1980 | Bruning ........................ 355/19 |
| 4,285,801 | A | 8/1981 | Chiang ........................ 204/299 |
| 4,655,897 | A | 4/1987 | Disanto et al. ............. 359/296 |
| 4,680,103 | A | 7/1987 | Beilin Solomon I, et al. .......................... 204/299 |
| 4,741,604 | A | 5/1988 | Kornfeld ..................... 359/296 |
| 4,741,988 | A | 5/1988 | Van der Zande et al. ... 430/312 |
| 4,891,245 | A | 1/1990 | Micale .................... 427/213.3 |

(List continued on next page.)

FOREIGN PATENT DOCUMENTS

| CA | 2340683 | 2/2001 |
| DE | 199 27 359.6 | 12/2000 |

(List continued on next page.)

OTHER PUBLICATIONS

Cominsky, B. et al., "An Electrophoretic Ink For All–Printed Reflective Electronic Displays", Letters to Nature, pp. 253–255 (1998).

(List continued on next page.)

*Primary Examiner*—Georgia Epps
*Assistant Examiner*—William Choi
(74) *Attorney, Agent, or Firm*—Howrey Simon Arnold & White, LLP

(57) ABSTRACT

This invention relates to an electrophoretic display comprising a transparent top viewing electrode, a bottom electrode and a plurality of isolated cells having well-defined size, shape and aspect ratio, said cells filled with charged pigment particles dispersed in a dielectric solvent or solvent mixture, and a color filter placed with the top transparent electrode.

28 Claims, 3 Drawing Sheets

U.S. PATENT DOCUMENTS

| | | | |
|---|---|---|---|
| 4,924,257 A | 5/1990 | Jain | 355/53 |
| 4,995,718 A | 2/1991 | Jachimowicz et al. | 353/31 |
| 5,177,476 A | 1/1993 | Disanto et al. | 345/107 |
| 5,200,120 A | 4/1993 | Sakai | 264/1.33 |
| 5,274,481 A | 12/1993 | Kim | 349/86 |
| 5,276,438 A | 1/1994 | DiSanto et al. | 345/107 |
| 5,279,511 A | 1/1994 | DiSanto et al. | 445/24 |
| 5,285,236 A | 2/1994 | Jain | 355/53 |
| 5,380,362 A | 1/1995 | Schubert | 106/493 |
| 5,398,041 A | 3/1995 | Hyatt | 445/88 |
| 5,403,518 A | 4/1995 | Schubert | 252/572 |
| 5,432,526 A | 7/1995 | Hyatt | 345/87 |
| 5,450,220 A | 9/1995 | Onishi et al. | 349/89 |
| 5,460,688 A | 10/1995 | Disanto et al. | 216/5 |
| 5,573,711 A | 11/1996 | Hou et al. | 252/572 |
| 5,589,100 A | 12/1996 | Grasso et al. | 252/299.01 |
| 5,652,645 A | 7/1997 | Jain | 355/53 |
| 5,699,097 A | 12/1997 | Takayama et al. | 347/171 |
| 5,731,860 A | 3/1998 | Harada et al. | 349/158 |
| 5,739,889 A | 4/1998 | Yamada et al. | 349/156 |
| 5,835,174 A | 11/1998 | Clikeman et al. | 349/86 |
| 5,843,333 A | 12/1998 | Hakemi | 252/299.5 |
| 5,872,552 A | 2/1999 | Gordon, II et al. | 345/107 |
| 5,877,848 A | 3/1999 | Gillette et al. | 355/85 |
| 5,895,541 A | 4/1999 | Kobayashi et al. | 156/240 |
| 5,914,806 A | 6/1999 | Gordon, II et al. | 359/296 |
| 5,930,026 A | 7/1999 | Jacobson et al. | 359/296 |
| 5,942,154 A | 8/1999 | Kim et al. | 252/299.01 |
| 5,956,112 A | 9/1999 | Fujimori et al. | 349/156 |
| 5,961,804 A | 10/1999 | Jacobson et al. | 204/606 |
| 5,976,405 A | 11/1999 | Clikeman et al. | 252/299.01 |
| 5,985,084 A | 11/1999 | Summersgill et al. | 156/273.7 |
| 5,995,190 A | 11/1999 | Nagae et al. | 349/156 |
| 6,017,584 A | 1/2000 | Albert et al. | 427/213.3 |
| 6,018,383 A | 1/2000 | Dunn et al. | 355/49 |
| 6,037,058 A | 3/2000 | Clikeman et al. | 428/402.2 |
| 6,064,508 A | 5/2000 | Forgette et al. | 359/267 |
| 6,067,185 A | 5/2000 | Albert et al. | 359/296 |
| 6,111,598 A | 8/2000 | Faris | 348/57 |
| 6,113,810 A | 9/2000 | Hou et al. | 252/572 |
| 6,113,836 A | 9/2000 | Sakai et al. | 264/400 |
| 6,120,588 A | 9/2000 | Jacobson | 106/31.16 |
| 6,120,839 A | 9/2000 | Comiskey | 427/213.3 |
| 6,120,946 A | 9/2000 | Johnson et al. | 430/7 |
| 6,166,797 A | 12/2000 | Bruzzone et al. | 349/155 |
| 6,172,798 B1 | 1/2001 | Albert et al. | 359/296 |
| 6,184,856 B1 | 2/2001 | Gordon, II et al. | 345/107 |
| 6,191,250 B1 | 2/2001 | Aida et al. | 528/196 |
| 6,225,971 B1 | 5/2001 | Gordon, II et al. | 345/107 |
| 6,239,896 B1 | 5/2001 | Ikeda | 359/240 |
| 6,252,624 B1 | 6/2001 | Yuasa et al. | 348/56 |
| 6,271,823 B1 * | 8/2001 | Gordon et al. | 345/107 |
| 6,312,304 B1 | 11/2001 | Duthaler et al. | 445/24 |
| 6,327,072 B1 | 12/2001 | Comiskey et al. | 359/296 |
| 6,337,761 B1 | 1/2002 | Rogers et al. | 359/296 |
| 6,392,785 B1 | 5/2002 | Albert et al. | 359/296 |
| 6,392,786 B1 | 5/2002 | Albert | 359/296 |
| 6,400,430 B2 | 6/2002 | Nakao et al. | 349/69 |
| 6,400,492 B1 | 6/2002 | Morita et al. | 359/296 |
| 6,512,626 B1 | 1/2003 | Schmidt | 359/296 |
| 6,514,328 B1 | 2/2003 | Katoh et al. | 106/31.28 |
| 6,525,865 B2 * | 2/2003 | Katase | 359/296 |
| 6,721,083 B2 * | 4/2004 | Jacobson et al. | 345/107 |
| 2001/0009352 A1 | 7/2001 | Moore | 313/582 |
| 2002/0018043 A1 | 2/2002 | Nakanishi | 345/107 |
| 2002/0029969 A1 | 3/2002 | Yager et al. | 204/465 |
| 2002/0126249 A1 | 9/2002 | Liang et al. | 349/187 |
| 2002/0182544 A1 | 12/2002 | Chan-Park et al. | 430/311 |
| 2002/0188053 A1 | 12/2002 | Zang et al. | 524/474 |
| 2002/0196525 A1 | 12/2002 | Chen et al. | 359/296 |
| 2003/0206329 A1 * | 11/2003 | Ikeda et al. | 359/296 |

FOREIGN PATENT DOCUMENTS

| | | | |
|---|---|---|---|
| EP | 1 313 412 | 4/1973 | |
| EP | 0 990 942 | 4/2000 | |
| EP | 1 065 553 | 1/2001 | |
| EP | 1 089 118 A2 | 4/2001 | G02F/1/167 |
| EP | 1 195 603 | 4/2002 | |
| JP | 57104116 | 6/1982 | |
| JP | 59-171930 | 9/1984 | G02F/1/19 |
| JP | 60-205452 | 10/1985 | |
| JP | 64-86116 | 3/1989 | |
| JP | 02223934 | 9/1990 | |
| JP | 02284125 | 11/1990 | |
| JP | 02284126 | 11/1990 | |
| JP | 05307197 | 11/1993 | |
| JP | 6242423 | 9/1994 | |
| JP | 09127524 | 4/1997 | |
| JP | 2000 035677 | 2/2000 | |
| JP | 2000 075497 | 3/2000 | |
| JP | 2001 042118 | 2/2001 | |
| JP | 2001 056653 | 2/2001 | |
| JP | 2001 147451 | 5/2001 | |
| WO | WO 97/04398 | 2/1997 | |
| WO | WO 98/57226 | 12/1998 | |
| WO | WO 99/08151 | 2/1999 | |
| WO | WO 99/53373 | 10/1999 | G02F/1/167 |
| WO | WO 99/56171 | 11/1999 | G02F/1/167 |
| WO | WO 00/03291 | 1/2000 | |
| WO | WO 00/36649 | 6/2000 | |
| WO | WO 00/60410 | 10/2000 | G02F/1/167 |
| WO | WO 00/77571 | 12/2000 | |
| WO | WO 01/67170 | 9/2001 | G02F/1/167 |
| WO | WO 02/01281 | 1/2002 | |

OTHER PUBLICATIONS

Dalisa , A.L., "Electrophoretic Display Technology", IEEE Transactions of Electron Devices, Jul. 1997, pp. 827–834.

Drzaic, P., "Liquid Crystal Dispersion", The PDLC Paradigm, (1995), pp. 1–9.

Harvey, T.G. "Replication Techniques For Micro–Optics", SPIE, vol. 3099, pp. 76–82 (1997).

Hopper, M.A. and Novotny, V., "An Electrophoretic Display, It's Properties, Model, and Addressing" IEEE Transactions on Electron Devices, vol. ED–26, No. 8, Aug. 1979, pp. 1148–1152.

Harbour, J.R. et al., "Subdivided Electrophoretic Display", Xerox Disclosure Journal, vol. 4, No. 6 (1979).

Lewis, J.C., et al., "Gravitational, Inter–Particle–Electrode Forces in Electrophoretic Display", Proceedings of the S.I.D., vol. 18/3&4 (1977).

Murau, P., et al., "The Understanding and Elimination of Some Suspension Instabilities in an Electrophoretic Display", J. Appl. Phys., 49(9), (1978).

Nakamura, E., et al., "Developement of Electrophoretic Display Using Microcapsulated Suspension", SID Digest, (1998), pp. 1014–1017.

Ota, I., et al., "Electrophoretic Image Display EPID Panel", Proceedings of the IEEE, vol. 1, No. 7, Jul. 1973.

Singer, B. and Dalisa, A.L., "An X–Y Addressable Electrophoretic Display", Proceedings of the S.I.D., vol. 18/3&4, (1977).

Slafer, D.W., et al., "Continuous Manufacturing of Thin Cover Sheet Optical Media", SPIE, vol. 1663, (1992), pp. 323–335.

U.S. Appl. No. 09/518,488, filed Mar. 3, 2000 (to be provided upon request).

U.S. Appl. No. 09/606,654, filed Jun. 28, 2000 (to be provided upon request).

Bryning et al., "37.4: Reverse–Emulsion Electrophoretic Display (REED)" *SID 98 Digest* pp. 1018–1021 (1998).

Inoue, S. et al., "High Resolution Microencapsulated Electrophoretic Display (EPD) Driven by Poly–Si TFTs With Four–Level Grayscale" *IEEE Transactions oh Electron Devices* 49(8), pp. 1532–1539 (2002).

Kazlas, P. et al., "12.1: 12.1" SVGA Microencapsulated Electrophoretic Active Matrix Display for Information Appliances" *SID 01 Digest* 152–155 (2001).

Kishi, E et al, "5.1 Development of In–Plane EPD", Canon Research Center, SID 00 Digest, pp–24–27.

Lewis, J.C., "Electrophoretic Displays", Allen Clark Research Centre, The Plessey Company Ltd., Caswell, Towcester, Northants, England, pp–223–240.

Matsuda Y. "Newly designed, high resolution, active matrix addressing in plane EPD" *IDW 02 EP2–3* 1341–1344 (2002).

Ota et al., "Developments in Electrophoretic Displays" *Proc. of SID*, vol. 18/3&4, pp–243–254 (1977).

\* cited by examiner

ELECTROPHORETIC DISPLAY WITH COLOR FILTERS

This application claims benefit of provisional application No. 60/308,437 filed Jul. 27, 2001.

BACKGROUND OF THE INVENTION a) Field of the Invention

This invention relates to an electrophoretic display comprising isolated cells of well-defined shape, size and aspect ratio which cells are filled with charged pigment particles dispersed in a solvent, and color filters placed with the top transparent conductor film.

b) Description of Related Art

The electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart and plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively are needed to drive the displays. In contrast, an array of thin film transistors (TFT) on the bottom plate and a common, non-patterned transparent conductor plate on the top viewing substrate are required for the active type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages. No backlight is needed in this type of reflective EPD displays.

A transmissive EPD is disclosed in U.S. Pat. No. 6,184,856 in which a backlight, color filters, and substrates with two transparent electrodes are used. The electrophoretic cells serve as a light valve. In the collected state, the particles are positioned to minimize the coverage of the horizontal area of the cell and allow the backlight to pass through the cell. In the distributed state, the particles are positioned to cover the horizontal area of the pixel and scatter or absorb the backlight. However, the backlight and color filter used in this device consume a great deal of power and are not desirable for hand-held devices such as PDAs (personal digital assistants) and e-books.

EPDs of different pixel or cell structures have been reported in prior art, for example, the partition-type EPD (M. A. Hopper and V. Novotny, IEEE Trans. Electr. Dev., Vol. ED 26, No. 8, pp. 1148–1152 (1979)) and the microencapsulated EPD (U.S. Pat. Nos. 5,961,804 and 5,930,026), and each of these has its own problems as noted below.

In a partition-type EPD, there are partitions between the two electrodes for dividing the space into smaller cells in order to prevent undesired movements of the particles such as sedimentation. However, difficulties are encountered in the formation of the partitions, the process of filling the display with the fluid, enclosing the fluid in the display, and keeping the suspensions of different colors separated from each other.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution and, to achieve a useful contrast ratio, their mean particle size is relatively large (50–150 microns). The large microcapsule size results in a poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent is often needed in this type of EPDs. However, the microencapsulation process in aqueous solution imposes a limitation on the type of charge-controlling agents that can be used. Other drawbacks associated with the microcapsule system include poor resolution and poor addressability for color applications.

An improved EPD technology was recently disclosed in co-pending applications, U.S. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01281) and U.S. Ser. No. 09/784,972, filed on Feb. 15, 2001, all of which are incorporated herein by reference. The improved EPD comprises closed isolated cells formed from microcups of well-defined shape, size and aspect ratio and filled with charged pigment particles dispersed in a dielectric solvent. The electrophoretic fluid is isolated and sealed in each microcup.

The microcup structure, in fact, enables a format flexible, efficient roll-to-roll continuous manufacturing process for the preparation of EPDs. The displays can be prepared on a continuous web of conductor film such as ITO/PET by, for example, (1) coating a radiation curable composition onto the ITO/PET film, (2) making the microcup structure by a microembossing or photolithographic method, (3) filling the mircoups with electrophoretic fluid and sealing the microcup array, (4) laminating the scale microcups with the other conductor film, and (5) slicing and cutting the display to a desirable size or format for assembling.

One advantage of this EPD design is that the microcup wall is in fact a built-in spacer to keep the top and bottom substrates apart at a fixed distance. The mechanical properties and structural integrity of microcup displays are significantly better than any prior art displays including those manufactured by using spacer particles. In addition, displays involving microcups have desirable mechanical properties including reliable display performance when the display is bent, rolled, or under compression pressure from, for example, a touch screen application. The use of the microcup technology also eliminates the need of an edge seal adhesive which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut to almost any dimension without the risk of damaging the display performance due to the loss of display fluids in the active areas. In other words, the microcup structure enables a format flexible display manufacturing process, wherein the process produces a continuous output of displays in a large sheet format which can be sliced and diced to any desired format. The isolated microcup or cell structure is particularly important when cells are filled with fluids of different specific properties such as colors and switching rates. Without the microcup structure, it will be very difficult to prevent the fluids in adjacent areas from intermixing, or being subject to cross-talk during operation.

SUMMARY OF THE INVENTION

The first aspect of the present invention is directed to an EPD comprising isolated cells of well-defined shape, size and aspect ratio and color filters placed with the top transparent conductor film. The cells are filled with charged pigment particles dispersed in a dielectric solvent.

More specifically, the EPD of the present invention, comprises a top transparent electrode plate, a bottom electrode plate and the isolated cells are enclosed between the two electrode plates. The display has color filters placed with the top transparent conductor film to generate EPDs of multiple colors. The color filter may be placed underneath the conductor film, between the conductor film and the substrate layer on which the conductor film is coated, or on top of the substrate layer.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure followed by solvent development.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of EPDs. In this application, it refers to the depth to width or depth to length ratio of the microcups.

The term "isolated" refers to electrophoretic cells which are individually sealed with a sealing layer so that the electrophoretic fluid in one cell cannot be transferred to other cells.

The term "conductor film" is understood to be conductor films coated on a plastic substrate.

Preferred Embodiments

Figure 1:
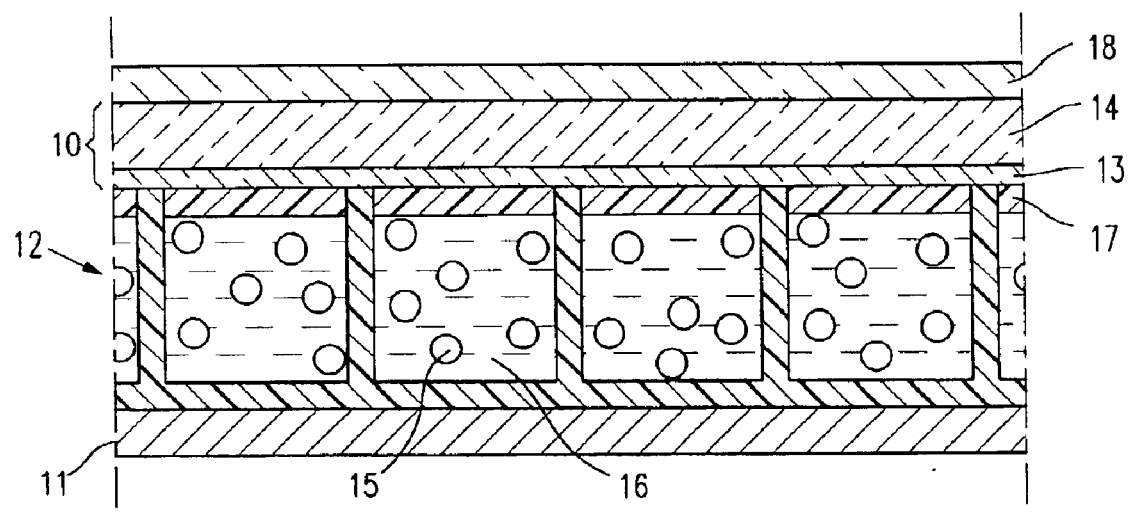
FIG. 1 is a schematic depiction of the electrophoretic display of the present invention.

An EPD of the present invention, as shown in FIG. 1, comprises two electrode plates (10, 11) and a layer of isolated cells (12) enclosed between the two electrodes. The top electrode plate (10) is transparent, preferably colorless, and comprises a conductor film (13) on a plastic substrate (14). The cells are of well-defined shape and size and filled with charged pigment particles (15) dispersed in a dielectric solvent (16). The cells are also individually sealed with a sealing layer (17). When a voltage difference is imposed between the two electrodes, the charged particles migrate to one side, such that either the color of the pigment or the color of the solvent is seen through the top transparent viewing layer.

A color filter (18) layer may be placed on top of the plastic substrate (14) as shown, or between the conductor film (13) and the plastic substrate (14) (not shown), or between the conductor film (13) and the sealing layer (17) (not shown).

The charged pigment particles (15) are preferably white and the dielectric solvent (16) is clear and may be colorless or colored.

Alternatively, each individual cell may be filled with both positively and negatively charged particles, and the two types of particles may be of different colors.

I. Preparation of the Microcups

I(a) Preparation of the Microcups by Embossing

The male mold may be prepared by any appropriate method, such as a diamond turn process or a photoresist process followed by either etching or electroplating after the resist is developed. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to radiation, such as ultraviolet (UV). A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition as described in "Continuous manufacturing of thin cover sheet optical media", SPIE Proc. Vol. 1663, pp. 324 (1992). The floor of the mold is typically between about 50 to 400 microns thick. The master can also be made using other microengineering techniques including e-beam writing, dry etching, chemical etching, laser writing or laser interference as described in "Replication techniques for micro-optics", SPIE Proc. Vol. 3099, pp. 76–82 (1997). Alternatively, the mold can be made by photomachining using plastics, ceramics or metals.

The male mold thus prepared for making EPD microcups typically has protrusions between about 3 to 500 microns, preferably between about 5 to 100 microns, and most preferably about 10 to 50 microns. The male mold may be in the form of a belt, a roller, or a sheet. For continuous manufacturing, the belt or the roller type of mold is preferred. Prior to applying a UV curable resin composition, the mold may be treated with a mold release to aid in the demolding process. To further improve the demolding process, the conductor film may be precoated with a primer or an adhesion promoting layer to improve the adhesion between the conductor to the microcups.

Microcup Formation

Microcups may be formed either in a batchwise process or in a continuous roll-to-roll process as disclosed in the co-pending application, U.S. Ser. No. 09/784,972, filed on Feb. 15, 2001. The latter offers a continuous, low cost, high throughput manufacturing technology for production of compartments for use in electrophoretic or liquid crystal displays. Prior to applying a UV curable resin composition, the mold may be treated with a mold release to aid in the demolding process. The UV curable resin may be degassed prior to dispensing and may optionally contain a solvent. The solvent, if present, readily evaporates. The UV curable resin is dispensed by any appropriate means such as, coating, dipping, pouring and the like, over the male mold. The dispenser may be moving or stationary. A conductor film is overlaid onto the UV curable resin. Examples of suitable conductor film include transparent conductor ITO on plastic substrates such as polyethylene terephthalate, polyethylene naphthate, polyaramid, polyimide, polycycloolefin, polysulfone, epoxy and their composite-sand polycarbonate. Pressure may be applied, if necessary, to ensure proper bonding between the resin and the plastic and to control the thickness of the floor of the microcups. The pressure may be applied using a laminating roller, vacuum molding, press device or any other like means. Alternatively, the UV curable resin can be coated onto the conductor film and embossed by the mold. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheetconductor film, the conductor filmlatter needs to have good adhesion to the UV curable resin which should have a good release property against the mold surface. To improve the adhesion between the conductor and the microcups, the conductor film may be precoated with a primer or an adhesion promoting layer.

The thermoplastic or thermoset precursor for the preparation of the microcups may be polyvalent acrylate or methacrylate, polyvalent vinyl including vinylbenzene, vinylsilane, vinylether, polyvalent epoxide, polyvalent allyl and oligomers or polymers containing crosslinkable functional groups and the like Multifunctional acrylate and their oligomers are the most preferred. A combination of multi-functional epoxide and multifunctional acrylate is also very useful to achieve desirable physico-mechanical properties. A crosslinkable oligomer imparting flexibility, such as urethane acrylate, polyester acrylate, and acrylated rubbers may be added to improve the flexure resistance of the embossed microcups. The composition may contain oligomer, monomer, additives and optionally also a polymer. The glass transition temperatures (Tg) for this class of materials usually range from about −70° C. to about 150° C., preferably from about −20° C. to about 50° C. The microembossing process is typically carried out at a temperature higher than the Tg of the UV curable composition. A heated male mold or a heated housing substrate against which the mold presses may be used to control the microembossing temperature and pressure.

The mold is released during or after the precursor layer is hardened to reveal an array of microcups. The hardening of the precursor layer may be accomplished by cooling, cross-linking by radiation, heat or moisture. If the curing of the thermoset precursor is accomplished by UV radiation, UV may radiate onto the transparent conductor film from the bottom or the top of the web. Alternatively, UV lamps may be placed inside the mold. In this case, the mold must be transparent to allow the UV light to radiate through the pre-patterned male mold on to the thermoset precursor layer.

I(b) Preparation of the Microcups by Imagewise Exposure

Figure 2A:
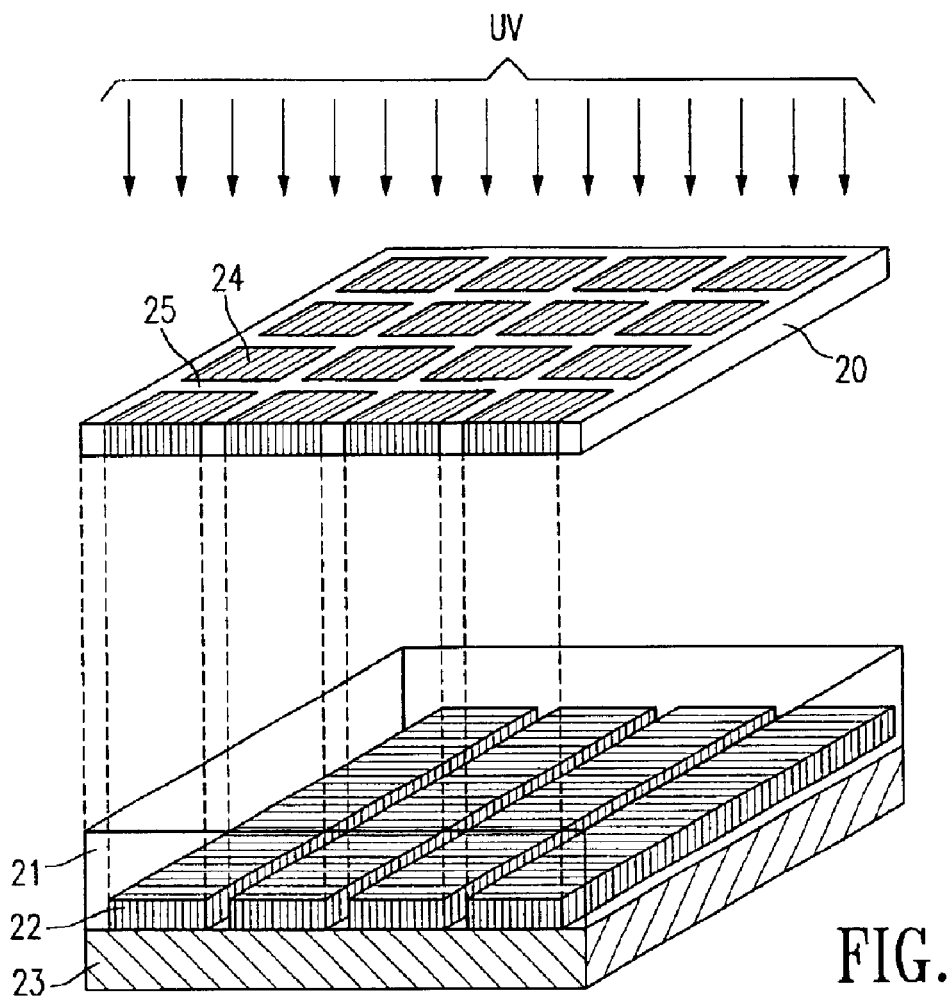
FIGS. 2A and 2B show processing steps for preparing the microcups involving imagewise exposure.
Figure 2B:
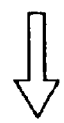
Figure 2B:
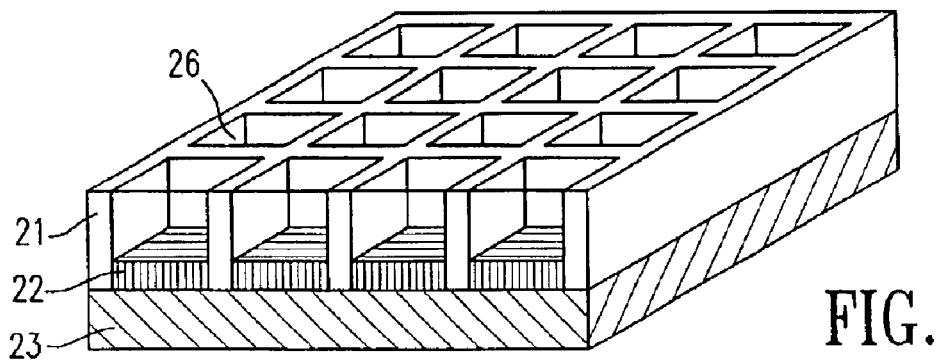

Alternatively, the microcups may be prepared by imagewise exposure (FIG. 2) of a radiation curable material (21) coated on the conductor film (22) to UV or other forms of radiation through a mask (20). The conductor film (22) is on a plastic substrate (23).

For a roll-to-roll process, the photomask may be synchronized with the web and move at the same speed as the latter. In the photomask (20) in FIG. 2, the dark squares (24) represent the opaque area and the space (25) between the dark squares represents the opening area. The UV radiates through the opening area (25) onto the radiation curable material. The exposed areas become hardened and the unexposed areas (protected by the opaque area in the mask) are then removed by an appropriate solvent or developer to form the microcups (26). The solvent or developer is selected from those commonly used for dissolving, dispersing, or reducing the viscosity of radiation curable materials. Typical examples include methylethylketone, ethyl acetate, toluene, acetone, isopropanol, methanol, ethanol and the like.

Alternatively, the preparation of the microcups may be accomplished by placing a photomask underneath the conductor film/substrate support web and, in this case, the UV light radiates through the photomask from the bottom and the substrate needs to be transparent to radiation.

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups for the red color may have a different shape or size from the microcups for the green or the blue color. Furthermore, a pixel may consist of different numbers of microcups of different colors. For example, a pixel may consist of a number of small green microcups, a number of large red microcups, and a number of small blue microcups. It is not necessary to have the same shape and number for the three colors.

The openings of the microcups may be round, square, rectangular, hexagonal, or any other shape. The partition area between the openings is preferably kept small in order to achieve a high color saturation and contrast while maintaining desirable mechanical properties. Consequently, the honeycomb-shaped opening is preferred over, for example, the circular opening.

The dimension of each individual microcup may be in the range of about $10^2$ to about $1\times10^6$ $\mu m^2$, preferably from about $10^3$ to about $1\times10^5$ $\mu m^2$. The depth of the microcups is typically in the range of about 5 to about 100 microns, preferably from about 10 to about 50 microns. The ratio of opening area to the total area is in the range of from about 0.05 to about 0.95, preferably from about 0.4 to about 0.90.

II. Preparation of the Suspension/Dispersion

The suspensions filled in the microcups comprise a dielectric solvent with charged pigment particles dispersed therein and the particles migrate under the influence of an electric field. The suspensions may optionally contain additional contrasting colorants which may or may not migrate in the electric field. The suspension may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, and 3,668,106, and as described in *IEEE Trans. Electron Devices*, ED-24, 827 (1977), and *J. Appl. Phys.* 49(9), 4820 (1978).

The suspending fluid medium is a dielectric solvent which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as dichlorobenzotrifluoride, 3,4, 5-trichlorobenzotrifluoride, chloropentafluoro-benzene, dichlorononane, pentachlorobenzene, and perfluorinated solvents such as perfluorodecalin, perfluorotoluene, perfluoroxylene, FC-43, FC-70 and FC-5060 from 3M Company, St. Paul Minn., low molecular weight fluorine containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden, HT-200, and Fluorolink from Ausimont or Krytox Oils and Greases K-Fluid Series from DuPont, Del. In one preferred embodiment, poly(chlorotrifluoroethylene) is used as the dielectric solvent. In another preferred embodiment, poly(perfluoro-propylene oxide) is used as the dielectric solvent.

The contrasting colorant may be selected from dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black (Pylam Products Co., Ariz.), Thermoplastic Black X-70 (BASF), anthraquinone blue, anthraquinone yellow 114, anthraquinone reds 111 and 135, anthraquinone green 28 and Sudan Black B (Aldrich). Fluorinated dyes are particularly useful when perfluorinated solvents are used. In the case of a contrasting color pigment, the colorant may also be dispersed in the dielectric medium and are preferably uncharged. If the contrasting color pigment particles are charged, they preferably carry a charge which is opposite from that of the primary color pigment particles. If both the contrasting color and the primary color particles carry the same charge, they should have different charge density or different electrophoretic mobility. The dye or pigment used in the EPDs must be chemically stable and compatible with other components in the suspension.

The primary, charged primary color particles are preferably white, and may be organic or inorganic pigments, such as $TiO_2$.

If colored pigment particles are used, they may be selected from phthalocyanine blue, phthalocyanine green, diarylide yellow, diarylide AAOT yellow, and quinacridone, azo, rhodamine, perylene pigment series (Sun Chemical), Hansa yellow G particles (Kanto Chemical). Particle size is preferably in the range of 0.01–5 microns, and is even more preferably in the range of 0.05–2 microns. These particles should have acceptable optical characteristics, should not be swollen or softened by the dielectric solvent, and should be chemically stable. The resulting suspension must also be stable against sedimentation, creaming or flocculation under normal operating conditions.

The migrating pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soaps, polybutene succinimide, maleic anhydride copolymers, vinylpyridine copolymers, vinylpyrrolidone copolymers (such as Ganex, International Specialty Products), (meth)acrylic acid copolymers, and N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC-430, FC-431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for producing the non-migrating fluid colorant may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For the present invention, the charged particles are typically white and the dielectric solvent is clear and may be colorless or colored.

III. Filling and Sealing of the Microcups

The filling of the microcups may be accomplished by conventional means. The sealing of the filled microcups, however, may be accomplished in a number of ways. A preferred approach is to disperse a UV curable composition containing multifunctional acrylates, acrylated oligomers, and photoinitiators into an electrophoretic fluid containing charged pigment particles dispersed in a colored dielectric solvent. The UV curable composition is immiscible with the dielectric solvent and has a specific gravity lower than that of the dielectric solvent and the pigment particles. The two components, UV curable composition and the electrophoretic fluid, are thoroughly blended in an in-line mixer and immediately coated onto the microcups with a precision coating mechanism such as Myrad bar, gravure, doctor blade, slot coating or slit coating. Excess fluid is removed by a wiper blade or a similar device. A small amount of a weak solvent or solvent mixture such as heptane, isopropanol, and methanol may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. UV or other forms of radiation such as visible light, IR and electron beam may be used to cure and seal the microcups. Alternatively, heat or moisture may also be employed to cure and seal the microcups if heat or moisture curable compositions are used.

A preferred group of dielectric solvents exhibiting desirable density and solubility discrimination against acrylate monomers and oligomers are halogenated hydrocarbons, perfluorinated solvents such as low molecular weight poly(perfluoro-propylene oxide), perfluoroethers from Ausimont, Italy or Du Pont, Del., and their derivative. Surfactants may be used to improve the adhesion and wetting at the interface between the electrophoretic fluid and the sealing materials. Useful surfactants include th FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing precursor may be coated sequentially into the microcups, particularly when the sealing precursor is at least partially compatible with the dielectric solvent. Thus, the sealing of the microcups may be accomplished by overcoating a thin layer of sealing material which is hardenable by radiation, heat, solvent evaporation, moisture or interfacial reactions and curing on the surface of the filled microcups. Thermoplastic elastomers are the preferred sealing material. Additives, such as silica particles and surfactants, may be used to improve the film integrity and coating quality. Interfacial polymerization followed by UV curing is very beneficial to the sealing process. Intermixing between the electrophoretic layer and the overcoat is significantly suppressed by the formation of a thin barrier layer at the interface by interfacial polymerization. The sealing may then be completed by a post curing step, preferably by UV radiation. To further reduce the degree of intermixing, it is highly desirable that the specific gravity of the overcoat is significantly lower than that of the electrophoretic fluid. Volatile organic solvents may be used to adjust the viscosity and the thickness of the coatings. When a volatile solvent is used in the overcoat, it is preferred that it is immiscible with the dielectric solvent. The two-step overcoating process is particularly useful when the dye used is at least partially soluble in the thermoset precursor.

IV. Preparation of Electrophoretic Displays of the Present Invention

Figure 3:
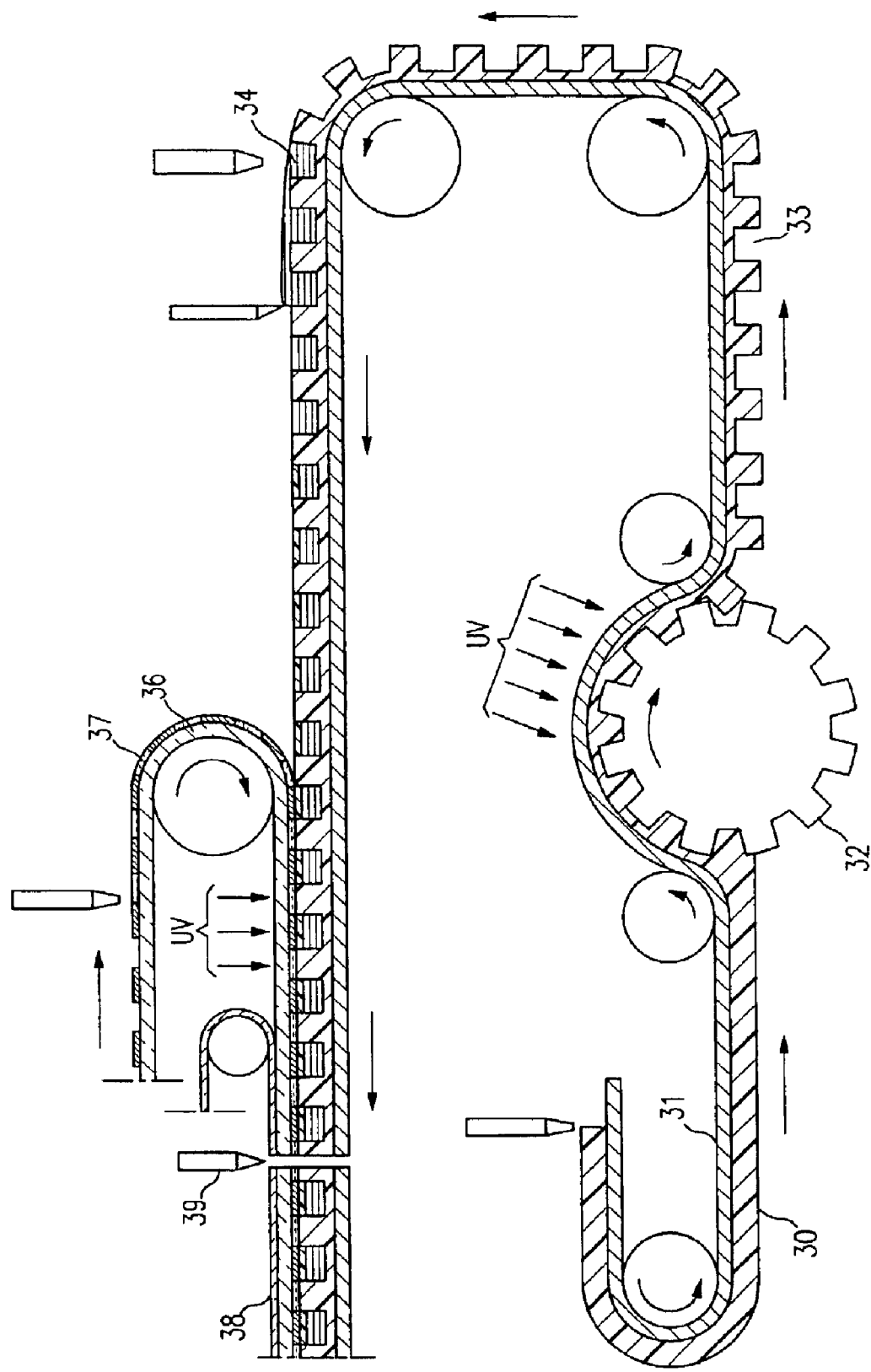
FIG. 3 is a flow chart for manufacturing the electrophoretic display of this invention.

The process is illustrated by the flow diagram as shown in FIG. 3. All microcups are filled with an electrophoretic dispersion. The process can be a continuous roll-to-roll process comprising the following steps:

1. Coat a layer of thermoplastic or thermoset precursor (30) optionally with a solvent on a conductor film (31). The solvent, if present, readily evaporates.

2. Emboss the thermoplastic or thermoset precursor layer at a temperature higher than the glass transition temperature of the thermoplastic or thermoset precursor layer by a pre-patterned male mold (32).

3. Release the mold from the thermoplastic or thermoset precursor layer preferably during or after it is hardened by proper means.

4. Fill in the thus-formed array of microcups (33) with a charged pigment dispersion (34) in a clear dielectric solvent.

5. Seal the microcups by the methods described in copending patent applications, U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01281), U.S. Ser. No. 09/784,972, filed on Feb. 15, 2001, and U.S. Ser. No. 09/874,391, filed Jun. 4, 2001, thus forming closed electrophoretic cells containing the electrophoretic fluid.

The sealing methods include adding to the dielectric solvent at least a thermoset precursor which is incompatible with the solvent and has a lower specific gravity than the solvent and the pigment particles, followed by curing the thermoset precursor optionally by radiation such as UV or by heat or moisture during or after the thermoset precursor separates. Alternatively, the sealing of the microcups may be accomplished by directly overcoating and hardening the sealing composition over the surface of the electrophoretic fluid.

6. Laminate the sealed array of electrophoretic cells with a second conductor film (36) such as ITO/PET pre-coated with an adhesive layer (37) which may be a pressure sensitive adhesive, a hot melt adhesive, a heat, moisture, or radiation curable adhesive. At least one of the two conductors films used in step (1) and step (6) is transparent. In the case of active matrix EPDs, the thin film transistors (TFTs) may be used in this step.

7. Add a color filter (38) to the top transparent ITO/PET layer.

Alternatively, the color filter layer may be placed between the top viewing conductor layer (ITO) and the sealing layer, or between the top viewing conductor layer (ITO) and the PET plastic substrate layer.

The laminate adhesive in Step 6 may be post cured by radiation such as UV through the top conductor film if the latter is transparent to the radiation. The finished product may be cut (39) after the lamination step.

It is noted that in the method described above, the orientation of the ITO lines may vary. In addition, the color filter may be added after cutting (39).

The preparation of the microcups described above can be conveniently replaced by the alternative procedure of image-wise exposing the conductor film coated with a thermoset precursor followed by removing the unexposed areas by an appropriate solvent.

A monochrome display of the present invention may also be achieved by adding a filter of the same color to the top transparent conductor film layers of all cells. The top transparent conductor film layer is preferably colorless. The charged particles are typically white and the clear dielectric solvent may be black or of other colors. For example, the cells may have a red color filter and white charged particles dispersed in a clear black dielectric solvent. In this case, when the particles migrate to and remain at the top of the cells, the red color will be seen through the top conductor film. When the particles migrate to the bottom of the cells, the black color will be seen through the top conductor film as the light passing through the color filter is absorbed by the black color of the solvent.

A multiple color display of the present invention may be achieved by placing filters of different colors (i.e., red, green, blue, yellow, cyan or magenta, etc.) over the viewing side of individual cells. The additive colors (red, green, and blue) are preferred. The color filter may comprise stripes of the red, green or blue color. The charged particles may be white or colored, preferably white. The dielectric solvents in individual cells may be of different colors or the same color, preferably black. The color filter may optionally comprise a black matrix.

Alternatively, the cells may be filled with both positively and negatively charged particles. The two types of particles are of different colors. For example, the positively charged particles may be white and the negatively charged particles may be colored. When the white positively charged particles migrate to and remain at the top of a cell, the color of the filter is seen through the top viewing layer. When the colored negatively charged particles migrate to and remain at the top of the cell, a color combining the color of the filter and the color of the negatively charged particles is seen.

The display of the present invention may be manufactured at low cost. In addition, the display with a color filter is advantageous because it provides the option of having a colorless dielectric fluid. This eliminates the need of a potentially difficult dye selection process or a complex pigment dispersion process.

The thickness of the display produced by the present processes as described can be as thin as a piece of paper. The width of the display is the width of the coating web (typically 1–90 inches). The length of the display can be anywhere from inches to thousands of feet depending on the size of the roll.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display comprising
    (a) a transparent tops viewing electrode comprising a transparent conductor film on a transparent plastic substrate layer;
    (b) a bottom electrode;
    (c) a plurality of isolated cells having well-defined size, shape and aspect ratio, said cells are filled with an electrophoretic fluid comprising charged pigment particles dispersed in a dielectric solvent or solvent mixture and sealed with a sealing layer formed from a sealing composition having a specific gravity lower than that of said electrophoretic fluid; and
    (d) a color filter layer which is on top of the transparent plastic substrate layer, or is between the transparent conductor film and the transparent plastic substrate layer, or is underneath the transparent conductor film.

2. The electrophoretic display of claim 1 wherein the bottom electrode is a conductor film or a substrate containing thin film transistors.

3. The electrophoretic display of claim 1 wherein the cells are substantially uniform in size and shape.

4. The electrophoretic display of claim 1 wherein the plurality of cells comprises cells of different sizes and shapes.

5. The electrophoretic display of claim 1 wherein the cells are non-spherical.

6. The electrophoretic display of claim 1 wherein the cells are formed from microcups with an opening area ranging from about $10^2$ to about $1 \times 10^6$ $\mu m^2$.

7. The electrophoretic display of claim 1 wherein the cells are formed from microcups with an opening area ranging from about $10^3$ to about $1 \times 10^5$ $\mu m^2$.

8. The electrophoretic display of claim 1 wherein the cells are formed from microcups with an opening having a circular, polygonal, hexagonal, rectangular or square shape.

9. The electrophoretic display of claim 1 wherein the cells have a depth in the range from about 5 to about 100 microns.

10. The electrophoretic display of claim 1 wherein the cells have a depth in the range from about 10 to about 50 microns.

11. The electrophoretic display of claim 1 wherein the cells have an opening to total area ratio in the range from about 0.05 to about 0.95.

12. The electrophoretic display of claim 1 wherein the cells have an opening to total area ratio in the range from about 0.4 to about 0.9.

13. The electrophoretic display of claim 1 is a monochrome display.

14. The electrophoretic display of claim 1 is a multiple color display.

15. The electrophoretic display of claim 1 wherein said color filter is of the same color or different colors for said cells.

16. The electrophoretic display of claim 1 wherein said color filter comprises stripes of red, green and blue color.

17. The electrophoretic display of claim 1 wherein said color filter further comprises a black matrix.

18. The electrophoretic display of claim 1 wherein said particles are white or colored.

19. The electrophoretic display of claim 1 wherein said dielectric solvent in said cells are of the same colors or of different colors.

20. The electrophoretic display of claim 19 wherein said dielectric solvent in said cells is black.

21. The electrophoretic display of claim 1 wherein said particles carry opposite charges.

22. The electrophoretic display of claim 21 wherein the positively charged particles are white and the negatively charged particles are colored.

23. The electrophoretic display of claim 21 wherein the positively charged particles are colored and the negatively charged particles are white.

24. The electrophoretic display of claim 1 wherein said sealing composition is a radiation curable composition.

25. The electrophoretic display of claim 1 wherein said sealing composition is a heat or moisture curable composition.

26. The electrophoretic display of claim 1 wherein said sealing composition comprises a thermoplastic elastomer.

27. The electrophoretic display of claim 1 wherein said color filter layer is between the sealing layer and the transparent conductor film.

28. An electrophoretic display comprising
    (a) a transparent top viewing electrode comprising a conductor film on a transparent plastic substrate layer;
    (b) a bottom electrode;
    (c) a plurality of isolated cells having well-define size, shape and aspect ratio, said cells are filled with an electrophoretic fluid comprising charged pigment particles dispersed in a dielectric solvent or solvent mixture; and
    (e) a color filter layer which in between the transparent conductor film and the transparent plastic substrate layer or is underneath the transparent conductor film.

* * * * *